United States Patent
Effenberger et al.

(10) Patent No.: US 10,084,592 B2
(45) Date of Patent: Sep. 25, 2018

(54) SKEW CALCULATION IN CHANNEL-BONDED PASSIVE OPTICAL NETWORKS (PONS)

(71) Applicant: Futurewei Technologies, Inc., Plano, TX (US)

(72) Inventors: Frank Effenberger, Frisco, TX (US); Duane Remein, Raleigh, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/499,550

(22) Filed: Apr. 27, 2017

(65) Prior Publication Data

US 2017/0324538 A1  Nov. 9, 2017

Related U.S. Application Data

(60) Provisional application No. 62/332,522, filed on May 6, 2016.

(51) Int. Cl.
| | | |
|---|---|---|
| *H04L 7/00* | (2006.01) | |
| *H04J 3/06* | (2006.01) | |
| *H04J 14/02* | (2006.01) | |
| *H04L 12/26* | (2006.01) | |
| *H04Q 11/00* | (2006.01) | |

(52) U.S. Cl.
CPC .......... *H04L 7/0075* (2013.01); *H04J 3/0661* (2013.01); *H04J 3/0667* (2013.01); *H04J 14/0223* (2013.01); *H04L 43/0864* (2013.01); *H04Q 11/0003* (2013.01); *H04Q 11/0067* (2013.01); *H04Q 2011/0045* (2013.01)

(58) Field of Classification Search
CPC .................. H04B 10/07955; H04B 10/077; H04B 10/00; H04J 14/0221; H04J 14/0227; H04J 3/0661; H04J 3/0667; H04J 14/0223; H04L 7/0075; H04L 43/0864; H04Q 11/0063; H04Q 11/0067
See application file for complete search history.

(56) References Cited

U.S. PATENT DOCUMENTS

| | | |
|---|---|---|
| 2007/0286612 A1 | 12/2007 | Kuwata et al. |
| 2012/0301147 A1 | 11/2012 | Zhao et al. |
| 2014/0219661 A1 | 8/2014 | Doo et al. |

(Continued)

FOREIGN PATENT DOCUMENTS

| | | |
|---|---|---|
| CN | 101707505 A | 5/2010 |

OTHER PUBLICATIONS

"IEEE Standard for Ethernet," IEEE Std 802.3-2015, IEEE Computer Society, IEEE Standards Association, Section 1, Sep. 3, 2015, 628 pages.

(Continued)

*Primary Examiner* — Ted Wang
(74) *Attorney, Agent, or Firm* — Conley Rose, P.C.

(57) ABSTRACT

An apparatus comprises: a first clock; a receiver configured to: receive a first packet via a first channel corresponding to a first wavelength, and receive a third packet via a third channel corresponding to a third wavelength; and a processor coupled to the receiver and configured to: implement channel bonding using the first channel and the third channel, synchronize the first clock based on the first packet, and calculate a channel skew between the first channel and the third channel based on the first clock.

18 Claims, 7 Drawing Sheets

(56) References Cited

U.S. PATENT DOCUMENTS

2015/0365191 A1    12/2015   Lee et al.

OTHER PUBLICATIONS

"IEEE Standard for Ethernet," IEEE Std 802.3-2015, IEEE Computer Society, IEEE Standards Association, Section 2, Sep. 3, 2015, 761 pages.

"IEEE Standard for Ethernet," IEEE Std 802.3-2015, IEEE Computer Society, IEEE Standards Association, Section 3, Sep. 3, 2015, 346 pages.

"IEEE Standard for Ethernet," IEEE Std 802.3-2015, IEEE Computer Society, IEEE Standards Association, Section 4, Sep. 3, 2015, 748 pages.

"IEEE Standard for Ethernet," IEEE Std 802.3-2015, IEEE Computer Society, IEEE Standards Association, Section 5, Sep. 3, 2015, 835 pages.

"IEEE Standard for Ethernet," IEEE Std 802.3-2015, IEEE Computer Society, IEEE Standards Association, Section 6, Sep. 3, 2015, 699 pages.

Gustlin, et al., "Dynamnic Skew for MLD," IEEE P802.3ba, Munich, May 2008, 16 pages.

"IEEE Standard for Ethernet," IEEE Std 802.3-2012, IEEE Computer Society, IEEE Standards Association, Section 5, 2012 844 pages.

"Part 3: Carrier Sense Multiple Access with Collision Detection (CSMA/CD) Access Method and Physical Layer Specifications; Amendment: Media Access Control Parameters, Physical Layers, and Management Parameters for Subscriber Access Networks," IEEE Std. 802.3ah-2004, IEEE Computer Society, Sep. 7, 2004, 640 pages.

"Part 3: Carrier Sense Multiple Access with Collision Detection (CSMA/CD) Access Method and Physical Layer Specifications; Amendment 1: Physical Layer Specifications and Management Parameters for 10 Gb/s Passive Optical Networks," IEEE Standard for Information Technology—Telecommunications and Information Exchange Between Systems—Local and Metropolitan Area Networks—Specific Requirements, IEEE Std. 802.3av-2009; Oct. 30, 2009, 236 pages.

Foreign Communication From a Counterpart Application, PCT Application No. PCT/CN2017/082873, English Translation of International Search Report dated Jul. 20, 2017, 4 pages.

Foreign Communication From a Counterpart Application, PCT Application No. PCT/CN2017/082873, English Translation of Written Opinion dated Jul. 20, 2017, 7 pages.

US 10,084,592 B2

SKEW CALCULATION IN CHANNEL-BONDED PASSIVE OPTICAL NETWORKS (PONS)

CROSS-REFERENCE TO RELATED APPLICATIONS

This application claims priority to U.S. provisional patent application No. 62/332,522 filed on May 6, 2016 by Futurewei Technologies, Inc. and titled "Skew Calculation in Channel-Bonded Passive Optical Networks (PONs)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is one system for providing network access over the last mile, which is the final portion of a telecommunications network that delivers communication to customers. A PON is a P2MP network comprising an OLT at a CO, ONUs at user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON is overlaid on top of a TDM PON. In other words, different wavelengths are multiplexed together to share a single feeder fiber, and each wavelength is shared by multiple users using TDM.

SUMMARY

In one embodiment, the disclosure includes an apparatus comprising: a first clock; a receiver configured to: receive a first packet via a first channel corresponding to a first wavelength, and receive a third packet via a third channel corresponding to a third wavelength; and a processor coupled to the receiver and configured to: implement channel bonding using the first channel and the third channel, synchronize the first clock based on the first packet, and calculate a channel skew between the first channel and the third channel based on the first clock. In some embodiments, the first packet comprises a first timestamp, wherein the third packet comprises a fourth timestamp, and wherein the processor is further configured to further synchronize the first clock based on the first timestamp; wherein the processor is further configured to select the first channel as a reference channel; the processor is further configured to further select the first channel as the reference channel based on a pre-determined design choice, a wavelength number, standardization, a command from an OLT, a random selection, or a first-come-first-served basis; the channel skew is a DCS, and wherein the processor is further configured to: extract the fourth timestamp from the third packet; determine a fifth time of the first clock when the receiver receives the third packet; and calculate the DCS based on the fourth timestamp and the fifth time; the processor is further configured to further calculate the DCS by subtracting the fourth timestamp from the fifth time; the apparatus further comprises a third clock, wherein the processor is further configured to synchronize the third clock based on the third packet; the channel skew is a DCS, and wherein the processor is further configured to: determine a fourth time of the third clock when the receiver receives the third packet; determine a fifth time of the first clock when the receiver receives the third packet; and calculate the DCS based on the fourth time and the fifth time; the processor is further configured to further calculate the DCS by subtracting the fourth time from the fifth time; the apparatus is an ONU.

In another embodiment, the disclosure includes a method comprising: receiving a first packet via a first channel corresponding to a first wavelength; receiving a third packet via a third channel corresponding to a third wavelength; implementing channel bonding using the first channel and the third channel; synchronizing a first clock based on the first packet; and calculating a channel skew between the first channel and the third channel based on the first clock. In some embodiments, the first packet comprises a first timestamp, wherein the third packet comprises a fourth timestamp, and wherein the method further comprises further synchronizing the first clock based on the first timestamp; the method further comprises selecting the first channel as a reference channel; the channel skew is a DCS, and wherein the method further comprises: extracting the fourth timestamp from the third packet; determining a fifth time of the first clock when receiving the third packet; and calculating the DCS based on the fourth timestamp and the fifth time; the method further comprises synchronizing a third clock based on the third packet; the channel skew is a DCS, and wherein the method further comprises: determining a fourth time of the third clock when receiving the third packet; determining a fifth time of the first clock when receiving the third packet; and calculating the DCS based on the fourth time and the fifth time.

In yet another embodiment, the disclosure includes an OLT comprising: a master clock; a receiver configured to: receive a second packet via a second channel corresponding to a second wavelength, and receive a fourth packet via a fourth channel corresponding to a fourth wavelength; and a processor coupled to the receiver and configured to: implement channel bonding using the second channel and the fourth channel, and calculate a channel skew between the second channel and the fourth channel based on the master clock. In some embodiments, the second packet comprises a second timestamp, and wherein the processor is further configured to calculate a second RTT based on the second timestamp and a third time of the master clock when the receiver receives the second packet; the fourth packet comprises a sixth timestamp, and wherein the processor is further configured to calculate a fourth RTT based on the sixth timestamp and a seventh time of the master clock when the receiver receives the fourth packet; the channel skew is a UCS, and wherein the processor is further configured to calculate the UCS by subtracting the second RTT from the fourth RTT.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
CO: central office
CPU: central processing unit
DCS: downstream channel skew
DSP: digital signal processor
EO: electrical-to-optical
EPON: Ethernet PON
IEEE: Institute of Electrical and Electronics Engineers
MPCP: Multi-Point Control Protocol
NG-PON: next-generation PON
ODN: optical distribution network
OE: optical-to-electrical
OLT: optical line terminal
ONT: optical network terminal
ONU: optical network unit
PON: passive optical network
P2MP: point-to-multipoint
RAM: random-access memory
RN: remote node
ROM: read-only memory
RTT: round-trip time
RX: receiver unit
SRAM: static RAM
TCAM: ternary content-addressable memory
TDM: time-division multiplexing
TWDM: time- and wavelength-division multiplexing
TX: transmitter unit
UCS: upstream channel skew
WDM: wavelength-division multiplexing.

Figure 1:
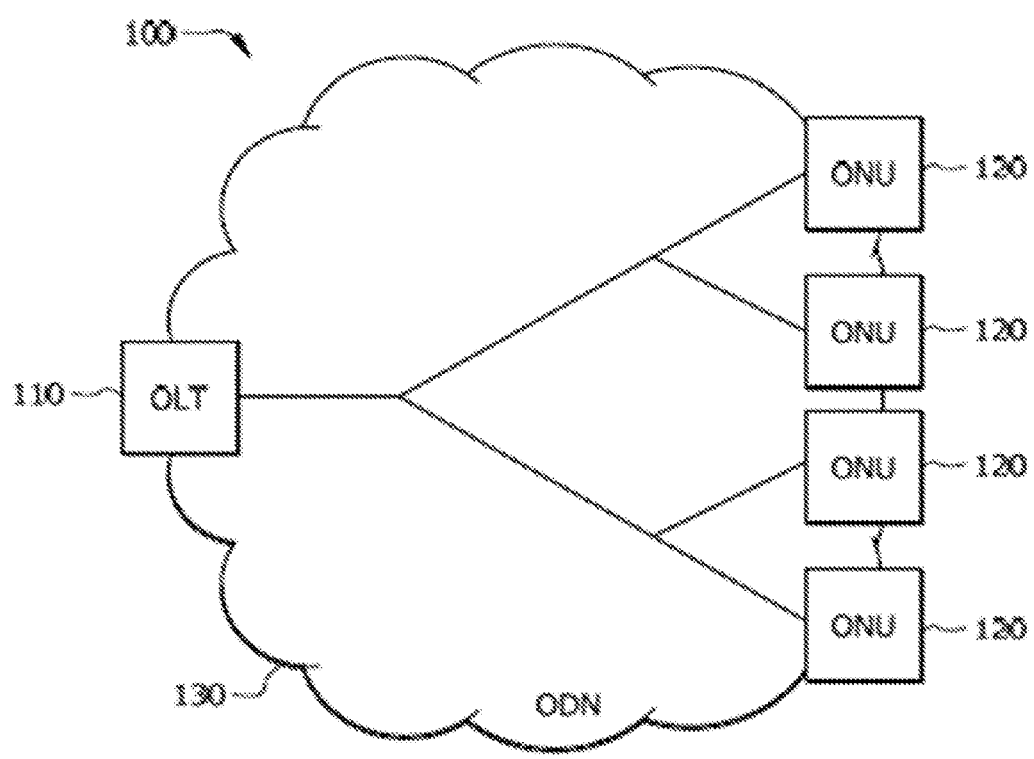
FIG. 1 is a schematic diagram of a PON.

FIG. 1 is a schematic diagram of a PON 100. The PON 100 comprises an OLT 110, a plurality of ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with the ONUs 120 and another network. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution system that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transmitters that convert electrical signals into optical signals and transmit the optical signals to the OLT 110, and the ONUs 120 comprise optical receivers that receive optical signals from the OLT 110 and convert the optical signals into electrical signals. The ONUs 120 further comprise second transmitters that transmit the electrical signals to the customers and second receivers that receive electrical signals from the customers. ONUs 120 and ONTs are similar, and the terms may be used interchangeably. The ONUs 120 are typically located at distributed locations such as customer premises, but they may also be located at other suitable locations.

Figure 2:
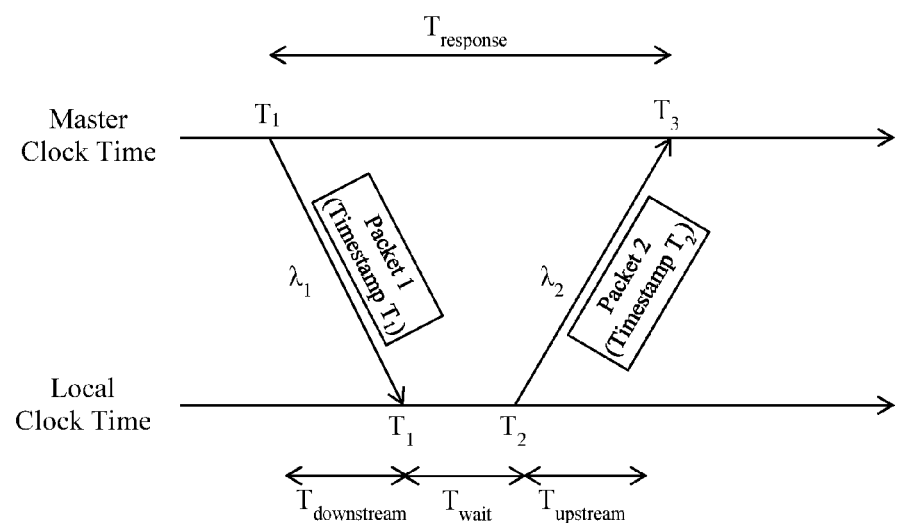
FIG. 2 is a timing diagram for determining an RTT.

FIG. 2 is a timing diagram 200 for determining an RTT. The timing diagram 200 depicts packet communication between the OLT 110 and an ONU 120 in FIG. 1. For the timing diagram 200, the PON 100 may be an EPON implementing MPCP. EPONs and MPCP are described in IEEE 802.3-2012, Section 5, 2012, which is incorporated by reference. MPCP assumes a single bi-directional channel. The OLT 110 maintains a master clock, the ONU 120 maintains a local clock, and the OLT 110 and the ONU 120 insert a timestamp in a timestamp field of each packet.

At master clock time $T_1$, the OLT 110 inserts timestamp $T_1$ into packet 1 and transmits packet 1 to the ONU 120 using channel 1 corresponding to wavelength $\lambda_1$. The ONU 120 receives packet 1 and synchronizes its local clock with timestamp $T_1$ from packet 1. However, the local clock time is delayed from the master clock time by a downstream transmission time for packet 1 to travel from the OLT 110 to the ONU 120 and is delayed by physical device delay times associated with the ONU 120 and other components in the PON 100. Downstream refers to the direction from the OLT 110 to the ONU 120, and upstream refers to the direction from the ONU 120 to the OLT 110. At local clock time $T_2$, the ONU 120 inserts timestamp $T_2$ into packet 2 and transmits packet 2 to the OLT 110 using channel 2 corresponding to wavelength $\lambda_2$. At master clock time $T_3$, the OLT 110 receives packet 2.

The OLT 110 extracts timestamp $T_2$ from packet 2, determines its master clock time as $T_2$ when it receives packet 2, and calculates an RTT as follows:

$$RTT = T_{response} - T_{wait}$$

$$RTT = (T_3 - T_1) - (T_2 - T_1)$$

$$RTT = T_3 - T_2. \tag{1}$$

The RTT represents the sum of the downstream transmission time and the upstream transmission time. By learning the RTT for each ONU 120, the OLT 110 may properly schedule each ONU's 120 transmission. However, using multiple channels makes such scheduling inaccurate.

Specifically, the PON 100 may employ link aggregation. However, link aggregation inefficiently uses data capacity. The PON 100 may also employ channel bonding, which refers to using multiple channels as a single bandwidth resource. In this context, channels are associated with different wavelengths, fibers, frequency bands, or other resources. In order to implement channel bonding, the PON 100 spreads packets over multiple channels at a transmitter side and reassembles the packets at a receiver side. The PON 100 preferably reassembles the packets with a minimum packet reordering.

Packet reordering refers to packets in a packet sequence being ordered in an unintended manner. For instance, a packet sequence is ordered packet 1, packet 2, packet 3, and packet 4. A transmitter transmits the packet sequence in that order, but a receiver receives the packet sequence in the order of packet 1, packet 3, packet 2, and packet 4. Thus, the packet sequence is reordered because packet 2 and packet 3 are ordered in an unintended manner.

In order to minimize packet reordering, each packet's received time may be used as an indicator of the packet's order in the packet sequence. If a packet's received time is considered to be the moment when a first bit of the packet is received and if a transmitter transmits the packets based on a round robin algorithm or other suitable algorithm, then a receiver will receive the packets in order. However, for this to hold true, the transmission time over each channel must be the same because any channel skew may cause packet reordering. Channel skew refers to a difference in communication times between two or more channels.

There are multiple sources of channel skew. First, different channels may be associated with different wavelengths, and transmission speed depends on wavelength. Second, channels may be relatively shorter or longer due to, for instance, length of an optical fiber cable between the OLT 110 and the ONUs 120. Third, logic components of the OLT 110 and the ONUs 120 may have uncontrolled phases due to varying vendor designs or other reasons. Fourth, implementations of the OLT 110 and the ONUs 120 may have delay variations. It is desirable to measure and compensate for channel skew so that each channel experiences an equal or substantially equal delay.

Disclosed herein are embodiments for channel skew calculation in channel-bonded PONs. The embodiments provide for ONUs to determine DCS and for an OLT to determine UCS. By determining the DCS and the UCS, the ONUs and the OLT may properly account for channel skew and therefore properly order packets. The embodiments apply to TDM PONs, WDM PONs, TWDM PONs, and any other suitable PONs and networks.

Figure 3:
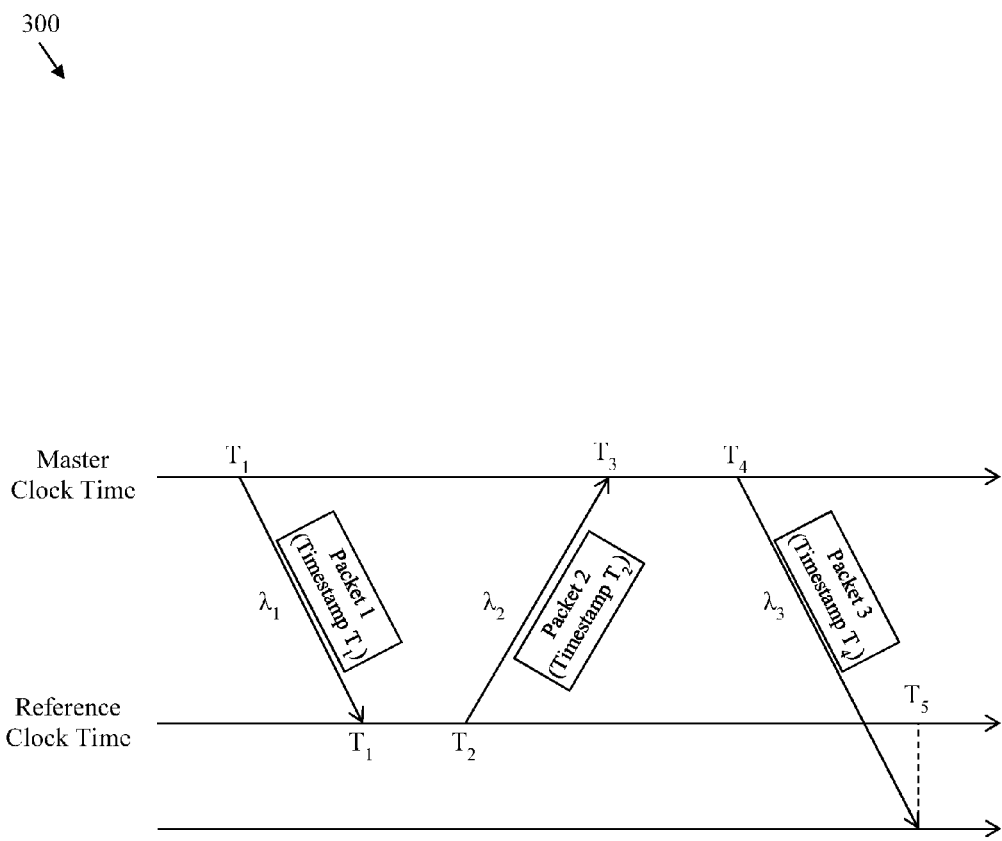
FIG. 3 is a timing diagram for determining DCS according to an embodiment of the disclosure.
Figure 4:
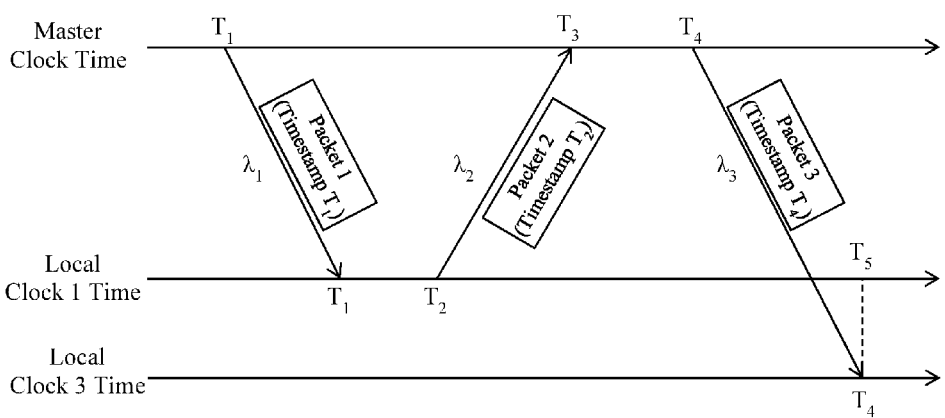
FIG. 4 is a timing diagram for determining DCS according to another embodiment of the disclosure.

FIGS. 3-4 demonstrate two embodiments for calculating DCS. In FIGS. 3-4, the OLT 110 and the ONU 120 use two downstream channels, channel 1 corresponding to wavelength $\lambda_1$ and channel 3 corresponding to wavelength $\lambda_3$, in a channel bonding scheme. Though two downstream channels are shown, the OLT 110 and the ONU 120 may use any suitable number of downstream channels. The OLT 110 maintains a master clock for all channels, and the ONU maintains local clocks in different ways, and the OLT 110 and the ONU 120 insert a timestamp in a timestamp field of each packet. Because the DCS calculations associated with FIGS. 3-4 are based on communication and processing from a logical entity of the OLT 110 and a logical entity of the ONU 120, the calculations account for nearly all sources of DCS.

FIG. 3 is a timing diagram 300 for determining DCS according to an embodiment of the disclosure. The timing diagram 300 depicts communication between the OLT 110 and an ONU 120 in FIG. 1. For the timing diagram 300, the PON 100 may be an EPON implementing MPCP. The ONU 120 selects a downstream channel, for instance channel 1, as a reference channel and selects a local clock corresponding to the reference channel, in this case local clock 1, as a reference clock. The ONU 120 selects the reference channel based on a pre-determined design choice, a wavelength number, standardization, a command from the OLT 110, a random selection, a first-come-first-served basis, or another suitable criterion. The wavelength number refers to a shortest wavelength, a longest wavelength, or another criterion. The first-come-first-served basis means that the ONU 120 selects as the reference channel a first channel to receive a packet in a time period.

At master clock time $T_1$, the OLT 110 inserts timestamp $T_1$ into packet 1 and transmits packet 1 to the ONU 120 using channel 1 corresponding to wavelength $\lambda_1$. The ONU 120 receives packet 1 and synchronizes its reference clock with timestamp $T_1$ from packet 1. At reference clock time $T_2$, the ONU 120 inserts timestamp $T_2$ into packet 2 and transmits packet 2 to the OLT 110 using channel 2 corresponding to wavelength $\lambda_2$. At master clock time $T_3$, the OLT 110 receives packet 2. At master clock time $T_4$, the OLT 110 inserts timestamp $T_4$ into packet 3 and transmits packet 3 to the ONU 120 using channel 3 corresponding to wavelength $\lambda_3$.

The ONU 120 extracts timestamp $T_4$ from packet 3, determines its reference clock time as $T_5$ when it receives packet 3, and calculates a DCS between channel 1 and channel 3 as follows:

$$DCS = T_5 - T_4. \tag{2}$$

The DCS in equation 2 may be an absolute value. The DCS represents a difference in communication times between two downstream channels, in this case channel 1 and channel 3.

FIG. 4 is a timing diagram 400 for determining DCS according to another embodiment of the disclosure. The timing diagram 400 depicts communication between the OLT 110 and an ONU 120 in FIG. 1. For the timing diagram 400, the PON 100 may be an EPON implementing MPCP. The ONU 120 does not select a reference channel or a reference clock. Instead, the ONU 120 maintains a local clock 1 for channel 1 and a local clock 3 for channel 3.

At master clock time $T_1$, the OLT 110 inserts timestamp $T_1$ into packet 1 and transmits packet 1 to the ONU 120 using channel 1 corresponding to wavelength $\lambda_1$. The ONU 120 receives packet 1 and synchronizes its local clock 1 with timestamp $T_1$ from packet 1. At reference clock time $T_2$, the ONU 120 inserts timestamp $T_2$ into packet 2 and transmits packet 2 to the OLT 110 using channel 2 corresponding to wavelength $\lambda_2$. At master clock time $T_3$, the OLT 110 receives packet 2. At master clock time $T_4$, the OLT 110 inserts timestamp $T_4$ into packet 3 and transmits packet 3 to the ONU 120 using channel 3 corresponding to wavelength $\lambda_3$. The ONU 120 receives packet 3 and synchronizes its local clock 3 with timestamp $T_4$ from packet 3. The ONU 120 determines its local clock 1 time as $T_5$ when it receives packet 3, determines its local clock 3 time as $T_4$ when it receives packet 3, and calculates a DCS between channel 1 and channel 3 according to equation 2.

Figure 5:
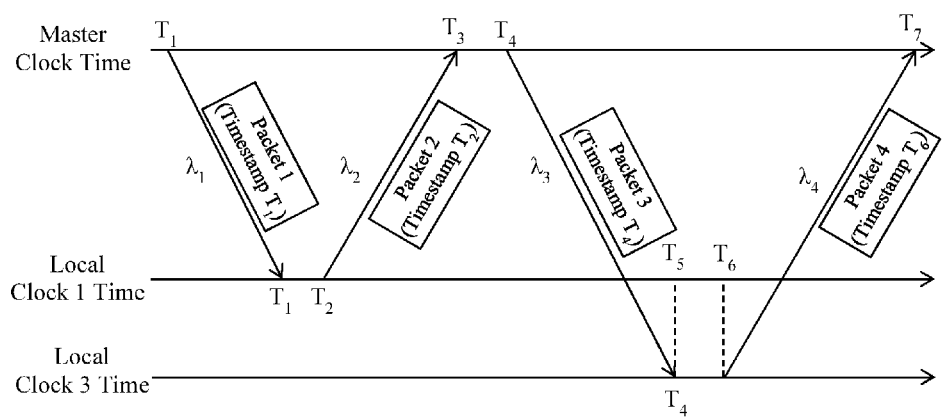
FIG. 5 is a timing diagram for determining UCS according to an embodiment of the disclosure.

FIG. 5 is a timing diagram 500 for determining UCS according to an embodiment of the disclosure. The timing diagram 500 depicts communication between the OLT 110 and the ONU 120 in FIG. 1. For the timing diagram 500, the PON 100 may be an EPON implementing MPCP. The OLT 110 and the ONU 120 use two upstream channels, channel 2 corresponding to wavelength $\lambda_2$ and channel 4 corresponding to wavelength $\lambda_1$, in a channel bonding scheme. Though two upstream channels are shown, the OLT 110 and the ONU 120 may use any suitable number of upstream channels. The OLT 110 maintains a master clock for all channels, the ONU 120 selects a reference channel and a reference clock, and the OLT 110 and the ONU 120 insert a timestamp in a timestamp field of each packet. The ONU 120 selects the reference channel and the reference clock as described above, though the first-come-first-served basis means that the ONU 120 selects as the reference channel a first channel to transmit a packet in a time period.

At master clock time $T_1$, the OLT 110 inserts timestamp $T_1$ into packet 1 and transmits packet 1 to the ONU 120 using channel 1 corresponding to wavelength $\lambda_1$. The ONU 120 receives packet 1 and synchronizes its reference clock with timestamp $T_1$ from packet 1. At reference clock time $T_2$, the ONU 120 inserts timestamp $T_2$ into packet 2 and transmits packet 2 to the OLT 110 using channel 2 corresponding to wavelength $\lambda_2$. At master clock time $T_3$, the OLT 110 receives packet 2. At master clock time $T_4$, the OLT 110 inserts timestamp $T_4$ into packet 3 and transmits packet 3 to the ONU 120 using channel 3 corresponding to wavelength $\lambda_3$. At reference clock time $T_4$, the ONU 120 inserts timestamp $T_6$ into packet 4 and transmits packet 4 to the OLT 110 using channel 4 corresponding to wavelength $\lambda_4$.

The OLT 110 extracts timestamp $T_2$ from packet 2, determines its master clock time as $T_3$ when it receives packet 2, and calculates $RTT_2$ of packet 2 as follows:

$$RTT_2 = T_3 - T_2. \quad (3)$$

In addition, the OLT 110 extracts timestamp $T_6$ from packet 4, determines its master clock time as $T_7$ when it receives packet 4, and calculates $RTT_4$ of packet 4 as follows:

$$RTT_4 = T_7 - T_6. \quad (4)$$

The OLT then calculates the UCS between channel 2 and channel 4 as follows:

$$UCS = RTT_4 - RTT_2. \quad (6)$$

The UCS in equation 6 may be an absolute value. The UCS represents a difference in communication times between two upstream channels, in this case channel 2 and channel 4.

The OLT 110 may calculate the UCS using equation 6 because $RTT_2$ is also equivalent to a sum of the time the first packet travels downstream and the second packet travels upstream and because $RTT_4$ is also equivalent to a sum of the time the third packet travels downstream and the fourth packet travels upstream. If the OLT 110 attempted to determine the UCS by exchanging packets in parallel, then the OLT 110 could measure the RTT for each channel, but the difference between the RTTs would include both the DCS and the UCS. That is undesirable because the OLT 110 would not have the necessary information to distinguish between the DCS and the UCS, and the OLT 110 uses the UCS to properly reassemble packets.

Figure 6:
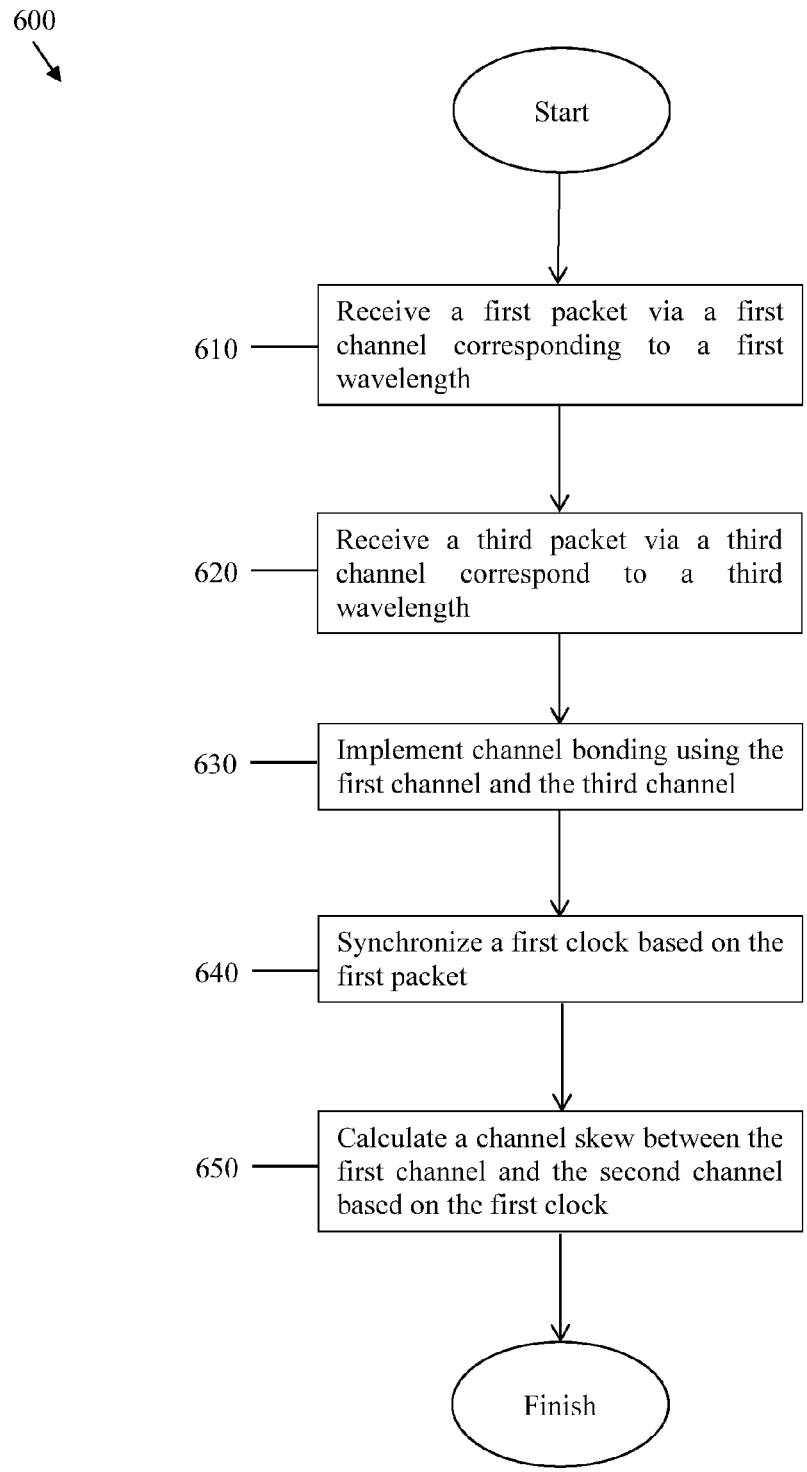
FIG. 6 is a flowchart illustrating a method of channel skew calculation according to an embodiment of the disclosure.

FIG. 6 is a flowchart illustrating a method 600 of channel skew calculation according to an embodiment of the disclosure. One of the ONUs 120 implements the method 600. At step 610, a first packet is received via a first channel corresponding to a first wavelength. For instance, the ONU 120 receives packet 1 via channel 1 corresponding to $\lambda_1$ in FIG. 3 or FIG. 4. At step 620, a third packet is received via a third channel corresponding to a third wavelength. For instance, the ONU 120 receives packet 3 via channel 3 corresponding to $\lambda_3$ in FIG. 3 or FIG. 4. At step 630, channel bonding is implemented using the first channel and the second channel. At step 640, a first clock is synchronized based on the first packet. For instance, the ONU 120 synchronizes either its reference clock based on timestamp $T_1$ in FIG. 3 or its local clock 1 based on timestamp $T_1$ in FIG. 4. Finally, at step 650, a channel skew is calculated between the first channel and the second channel based on the first clock. For instance, the ONU 120 calculates a DCS using equation 2 as described with respect to FIG. 3 or FIG. 4.

Figure 7:
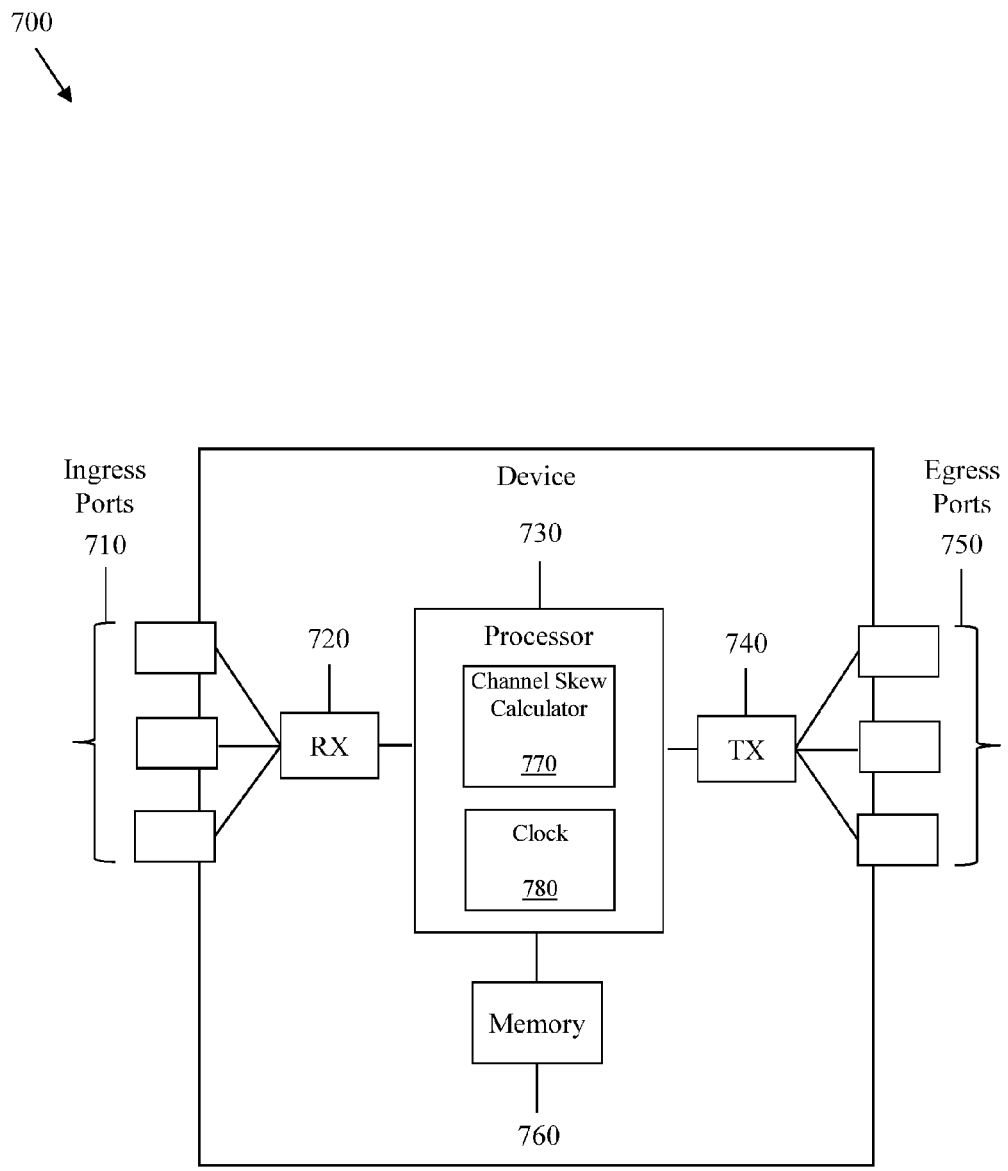
FIG. 7 is a schematic diagram of a device according to an embodiment of the disclosure.

FIG. 7 is a schematic diagram of a device 700 according to an embodiment of the disclosure. The device 700 may implement the disclosed embodiments. The device 700 comprises ingress ports 710 and an RX 720 coupled to the ingress ports 710 for receiving data; a processor, logic unit, or CPU 730 coupled to the RX 720 to process the data; a TX 740 coupled to the processor 730 and egress ports 750 coupled to the TX 740 for transmitting the data; and a memory 760 coupled to the processor 730 for storing the data. The device 700 may also comprise OE components and EO components coupled to the ingress ports 710, the RX 720, the TX 740, and the egress ports 750 for ingress or egress of optical or electrical signals.

The processor 730 is any suitable combination of hardware, middleware, firmware, or software. The processor 730 comprises any combination of one or more CPU chips, cores, FPGAs, ASICs, or DSPs. The processor 730 communicates with the ingress ports 710, RX 720, TX 740, egress ports 750, and memory 760. The processor 730 comprises a channel skew calculator 770 and a clock 780, which implement the disclosed embodiments. The inclusion of the channel skew calculator 770 and the clock 780 therefore provides a substantial improvement to the functionality of the device 700 and effects a transformation of the device 700 to a different state. Alternatively, the memory 760 stores the channel skew calculator 770 and the clock 780 as instructions, and the processor 730 executes those instructions.

The memory 760 comprises one or more disks, tape drives, or solid-state drives. The device 700 may use the memory 760 as an over-flow data storage device to store programs when the device 700 selects those programs for execution and to store instructions and data that the device 700 reads during execution of those programs. The memory 760 may be volatile or non-volatile and may be any combination of ROM, RAM, TCAM, or SRAM.

In an example embodiment, an apparatus comprises: a first clock element; a receiver element configured to: receive a first packet via a first channel corresponding to a first wavelength, and receive a third packet via a third channel corresponding to a third wavelength; and a processor element coupled to the receiver element and configured to: implement channel bonding using the first channel and the third channel, synchronize the first clock element based on the first packet, and calculate a channel skew between the first channel and the third channel based on the first clock element.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a first clock;
    a third clock;
    a receiver configured to:
        receive a first packet via a first channel corresponding to a first wavelength, the first packet comprises a first timestamp; and
        receive a third packet via a third channel corresponding to a third wavelength, the third packet comprises a fourth timestamp; and
    a processor coupled to the receiver and configured to:
        implement channel bonding using the first channel and the third channel;
        synchronize the first clock based on the first packet and the first timestamp;
        synchronize the third clock based on the third packet; and
        calculate a channel skew between the first channel and the third channel based on the first clock.

2. The apparatus of claim 1, wherein the processor is further configured to select the first channel as a reference channel.

3. The apparatus of claim 2, wherein the processor is further configured to select the first channel as the reference channel based on a pre-determined design choice, a wavelength number, standardization, a command from an optical line terminal (OLT), a random selection, or a first-come-first-served basis.

4. The apparatus of claim 2, wherein the channel skew is a downstream channel skew (DCS), and wherein the processor is further configured to:
    extract the fourth timestamp from the third packet;
    determine a fifth time of the first clock when the receiver receives the third packet; and
    calculate the DCS based on the fourth time and the fifth time.

5. The apparatus of claim 4, wherein the processor is further configured to calculate the DCS by subtracting the fourth timestamp from the fifth time.

6. The apparatus of claim 1, wherein the channel skew is a downstream channel skew (DCS), and wherein the processor is further configured to:
    determine a fourth time of the third clock when the receiver receives the third packet;
    determine a fifth time of the first clock when the receiver receives the third packet; and
    calculate the DCS based on the fourth time and the fifth time.

7. The apparatus of claim 6, wherein the processor is further configured to calculate the DCS by subtracting the fourth time from the fifth time.

8. The apparatus of claim 1, wherein the apparatus is an optical network unit (ONU).

9. The apparatus of claim 1, wherein the channel bonding comprises use of the first channel and the third channel as a single bandwidth resource.

10. A method comprising:
    receiving a first packet via a first channel corresponding to a first wavelength, the first packet comprises a first timestamp;
    receiving a third packet via a third channel corresponding to a third wavelength, the third packet comprises a fourth timestamp;
    implementing channel bonding using the first channel and the third channel;
    synchronizing a first clock based on the first packet and the first timestamp;
    synchronizing a third clock based on the third packet; and
    calculating a channel skew between the first channel and the third channel based on the first clock.

11. The method of claim 10, wherein the method further comprises selecting the first channel as a reference channel.

12. The method of claim 11, wherein the channel skew is a downstream channel skew (DCS), and wherein the method further comprises:
    extracting the fourth timestamp from the third packet;
    determining a fifth time of the first clock when receiving the third packet; and
    calculating the DCS based on the fourth timestamp and the fifth time.

13. The method of claim 10, wherein the channel skew is a downstream channel skew (DCS), and wherein the method further comprises:
    determining a fourth time of the third clock when receiving the third packet;
    determining a fifth time of the first clock when receiving the third packet; and
    calculating the DCS based on the fourth time and the fifth time.

14. The method of claim 10, wherein the channel bonding comprises use of the first channel and the third channel as a single bandwidth resource.

15. An optical line terminal (OLT) comprising:
    a master clock;
    a receiver configured to:
        receive a second packet via a second channel corresponding to a second wavelength, the second packet comprises a second timestamp; and
        receive a fourth packet via a fourth channel corresponding to a fourth wavelength; and
    a processor coupled to the receiver and configured to:
        implement channel bonding using the second channel and the fourth channel;

calculate a second round-trip time (RTT) based on the second timestamp and a third time of the master clock when the receiver receives the second packet; and calculate a channel skew between the second channel and the fourth channel based on the master clock.

16. The OLT of claim 15, wherein the fourth packet comprises a sixth timestamp, and wherein the processor is further configured to calculate a fourth RTT based on the sixth timestamp and a seventh time of the master clock when the receiver receives the fourth packet.

17. The OLT of claim 16, wherein the channel skew is an upstream channel skew (UCS), and wherein the processor is further configured to calculate the UCS by subtracting the second RTT from the fourth RTT.

18. The OLT of claim 15, wherein the channel bonding comprises use of the second channel and the fourth channel as a single bandwidth resource.

* * * * *